United States Patent
Craft et al.

(10) Patent No.: US 7,797,576 B2
(45) Date of Patent: Sep. 14, 2010

(54) CHECKPOINT OF APPLICATIONS USING UNIX® DOMAIN SOCKETS

(75) Inventors: David Jones Craft, Austin, TX (US); Vinit Jain, Austin, TX (US); Lance Warren Russell, Rosanky, TX (US)

(73) Assignee: International Business Machines Corporation, Armonk, NY (US)

( * ) Notice: Subject to any disclaimer, the term of this patent is extended or adjusted under 35 U.S.C. 154(b) by 775 days.

(21) Appl. No.: 11/741,500

(22) Filed: Apr. 27, 2007

(65) Prior Publication Data

US 2008/0270829 A1 Oct. 30, 2008

(51) Int. Cl.
*G06F 11/00* (2006.01)
(52) U.S. Cl. ................. 714/15; 714/16; 714/17
(58) Field of Classification Search .............. None
See application file for complete search history.

(56) References Cited

U.S. PATENT DOCUMENTS

| | | | |
|---|---|---|---|
| 6,766,471 B2 | 7/2004 | Meth | |
| 6,807,632 B1 | 10/2004 | Carpentier et al. | |
| 7,024,467 B2 * | 4/2006 | Rosensteel et al. | 709/219 |
| 7,076,555 B1 | 7/2006 | Orman et al. | |
| 7,082,551 B2 * | 7/2006 | Lawrance et al. | 714/13 |
| 7,443,878 B2 | 10/2008 | Hendel et al. | |
| 7,523,344 B2 * | 4/2009 | Qiao et al. | 714/6 |
| 7,653,833 B1 * | 1/2010 | Miller et al. | 714/13 |
| 7,657,787 B2 * | 2/2010 | Turner et al. | 714/15 |
| 2003/0140272 A1 * | 7/2003 | Lawrance et al. | 714/13 |
| 2004/0122953 A1 * | 6/2004 | Kalmuk et al. | 709/227 |
| 2005/0262411 A1 | 11/2005 | Vertes et al. | |
| 2006/0262716 A1 | 11/2006 | Ramaiah et al. | |
| 2008/0155103 A1 * | 6/2008 | Bailey | 709/227 |

FOREIGN PATENT DOCUMENTS

| | | |
|---|---|---|
| FR | 2 843 210 A1 | 2/2004 |
| FR | 2 872 605 A1 | 1/2006 |
| WO | WO2004015513 A2 | 2/2004 |
| WO | WO2006010812 A3 | 2/2006 |

OTHER PUBLICATIONS

"Ejasent Announces Persistent Connection Migration Product", Grid Today, pp. 1-2, retrieved Apr. 9, 2007 http://www.gridtoday.com/03/1027/102176.html.

Butler et al., "Monitoring Abnormal Process Termination in Multi-Process Systems", IBM Technical Disclosure Bulletin, Jul. 1995, vol. 38, No. 7, pp. 359-360.

* cited by examiner

*Primary Examiner*—Christopher S McCarthy
(74) *Attorney, Agent, or Firm*—Yee & Associates, P.C.; Matthew W. Baca

(57) ABSTRACT

A computer implemented method, apparatus, and computer program product for managing state data in a workload partitioned environment. Process state data for a process in a workload partition is saved. Process state data is used to restore the process to a given state. State data associated with open sockets and open files bound to the first process is saved. In response to a determination that the process is associated with a domain socket that is bound to a socket file, an absolute pathname for the socket file is saved. A domain socket associated with a connecting process in the workload partition uses the socket file to connect to a domain socket associated with a listening process in the same workload partition to enable the two processes to communicate with each other.

19 Claims, 5 Drawing Sheets

CHECKPOINT OF APPLICATIONS USING UNIX® DOMAIN SOCKETS

BACKGROUND OF THE INVENTION

1. Field of the Invention

The present invention is related generally to a data processing system and in particular to a method and apparatus for checkpoint operations. More particularly, the present invention is directed to a computer implemented method, apparatus, and computer usable program code for checkpointing and restoring UNIX® domain sockets in a workload partition environment.

2. Description of the Related Art

Data processing systems frequently utilize data integrity operations to ensure that the state of data stored in memory may be recreated in the event of a failure. A checkpoint operation is a data integrity operation in which the application state and memory contents for an application running on the kernel are written to stable storage at particular time points to provide a basis upon which to recreate the state of an application in the event of a failure. The particular time point at which state and memory contents are written to stable storage may be referred to as a checkpoint.

During a checkpoint operation, an application's state and data may be saved onto a local disk or a network disk at various pre-defined points in time to generate checkpoint data. When a failure occurs in the data processing system, a restart operation may be performed using the checkpoint data to roll back the state of the application to the last checkpoint. In other words, the application data may be restored from the checkpoint values stored on the disk.

AIX® workload partition (WPAR) is a product available from International Business Machines (IBM®) Corporation. A workload partition is a portion or representation of an operating system within a virtualized operating system environment. In a workload partition environment, an operating system image within a kernel can be partitioned into multiple virtual operating system instances. Each virtual operating system instance is a separate workload partition within the kernel.

Software running within each workload partition will appear to have its own separate instance of the operating system. A workload partition may include one or more processes. The processes in one partition are not allowed to interact with processes in other workload partitions.

SUMMARY OF THE INVENTION

The illustrative embodiments provide a computer implemented method, apparatus, and computer usable program code for managing state data in a workload partitioned environment. In one embodiment, process state data for a process in a workload partition is generated. Process state data is data used to restore the process to a given state. Socket state data associated with connected UNIX® domain sockets open in the process is generated during the checkpoint. The process state data and socket state data are saved to form saved state data. The saved state data is used to restore the connected UNIX® domain socket when the Workload partition is restored.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
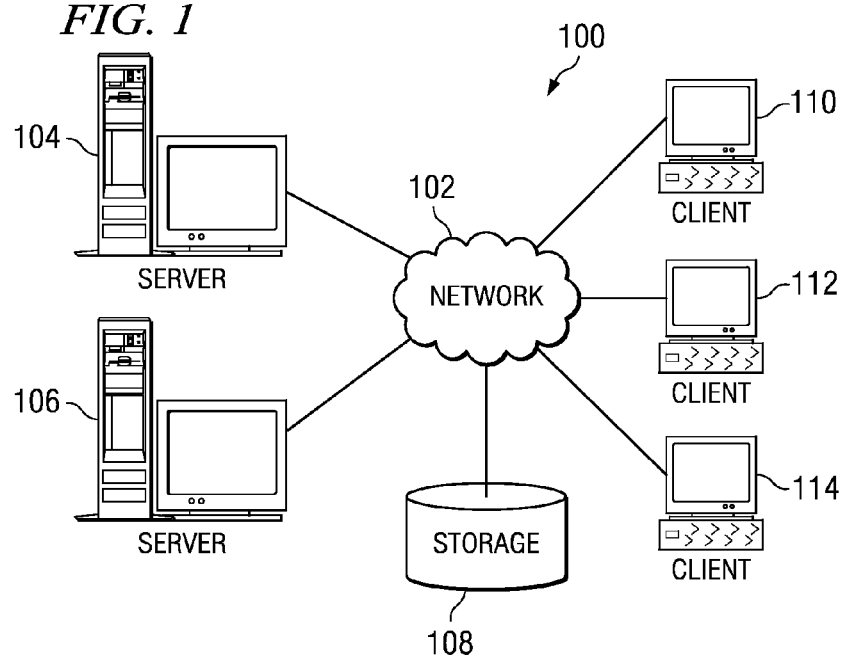
FIG. 1 is a pictorial representation of a network data processing systems in which illustrative embodiments may be implemented.
Figure 2:
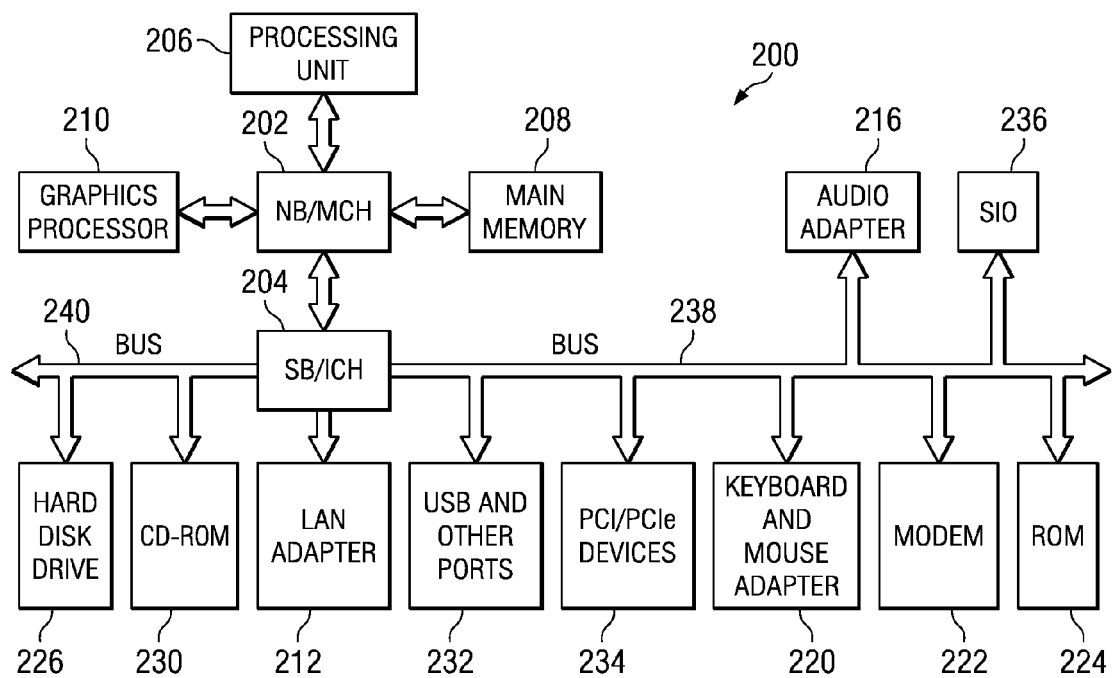
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows XP (Microsoft and Windows are trademarks of Microsoft Corporation in the United States, other countries, or both). An object oriented programming system, such as the Java programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

A given process within a single partition may communicate with one or more other processes in the same workload partition using UNIX® domain sockets. A UNIX® domain socket is an inter-procedure call socket or a virtual socket for enabling inter-process communication within a workload partition. Inter-process communication refers to techniques for exchanging data between two or more processes running with a single workload partition. A process connects to a UNIX® domain socket using a socket file for allowing UNIX® domain sockets to connect or form a communications linkage between processes. A process can send data and file descriptors to other processes within the same workload partition using these connected or linked UNIX® domain sockets.

The illustrative embodiments recognize that when a process or UNIX® domain socket is destroyed or lost, such as when the kernel is rebooted, power is lost, or the computer system unexpectedly shuts down, the processes communicating over the UNIX® domain sockets may not be restored if the state of the processes, UNIX® domain sockets, and data regarding open files bound to the processes and/or UNIX® domain sockets is not saved.

In response to a determination that the process may be checkpointed at a later time during the bind operation of the UNIX® domain socket to the socket file, an absolute pathname for the socket file bound to UNIX® domain socket is saved in the socket structure. A UNIX® domain socket associated with a process initiating the connection in the workload partition uses the socket file to connect to the UNIX® domain socket bound to that socket file and associated with a process in the same workload partition to enable the two processes to send and receive data between them.

The illustrative embodiments recognize the need for saving UNIX® domain socket state information during a checkpoint to enable re-establishment of UNIX® domain socket linkages. Therefore, the illustrative embodiments provide a computer implemented method, apparatus, and computer program product for a checkpoint process in a workload partitioned environment. In one embodiment, process state data for a process in a workload partition is generated. Process state data is data used to restore the process to a given state. Socket state data associated with connected UNIX® domain sockets open in the process is generated during the checkpoint. The process state data and socket state data are saved to form saved state data. The saved state data is used to restore the connected UNIX® domain socket when the Workload partition is restored.

In another embodiment, a computer implemented method, apparatus, and computer program product is provided for restoring processes in a workload partitioned environment. In one embodiment, a first process in a workload partition in the workload partitioned environment is restored using process state data for the process. Open files and open sockets bound to the first process are restored. A socket file bound to a first UNIX® domain socket associated with the first process is restored using an absolute pathname for the socket file saved in a state file associated with the workload partition.

In response to a determination that a connection between the first UNIX® domain socket bound to the socket file and a second domain socket associated with a second process needs to be restored, a pointer to a virtual node representing the socket file in the second domain socket is saved. The virtual node points to the first UNIX® domain socket and wherein the first domain socket points to the virtual node. In a later phase, the second socket follows the pointer to the virtual node which is expected to now point to the first UNIX® domain socket. The process establishes the connection between the two UNIX® domain sockets. This two phase approach ensures that the order of restoration in the first phase is not important.

The illustrative embodiments are described as being implemented in a UNIX® type operating system using UNIX® domain sockets. However, the illustrative embodiments may also be implemented in any type of operating system and using any type of inter-procedure call socket or virtual socket for enabling inter-process communication within a workload partition to implement the features of the embodiments. The illustrative embodiments are not limited to implementation in UNIX® domain sockets or UNIX® operating systems.

Figure 3:
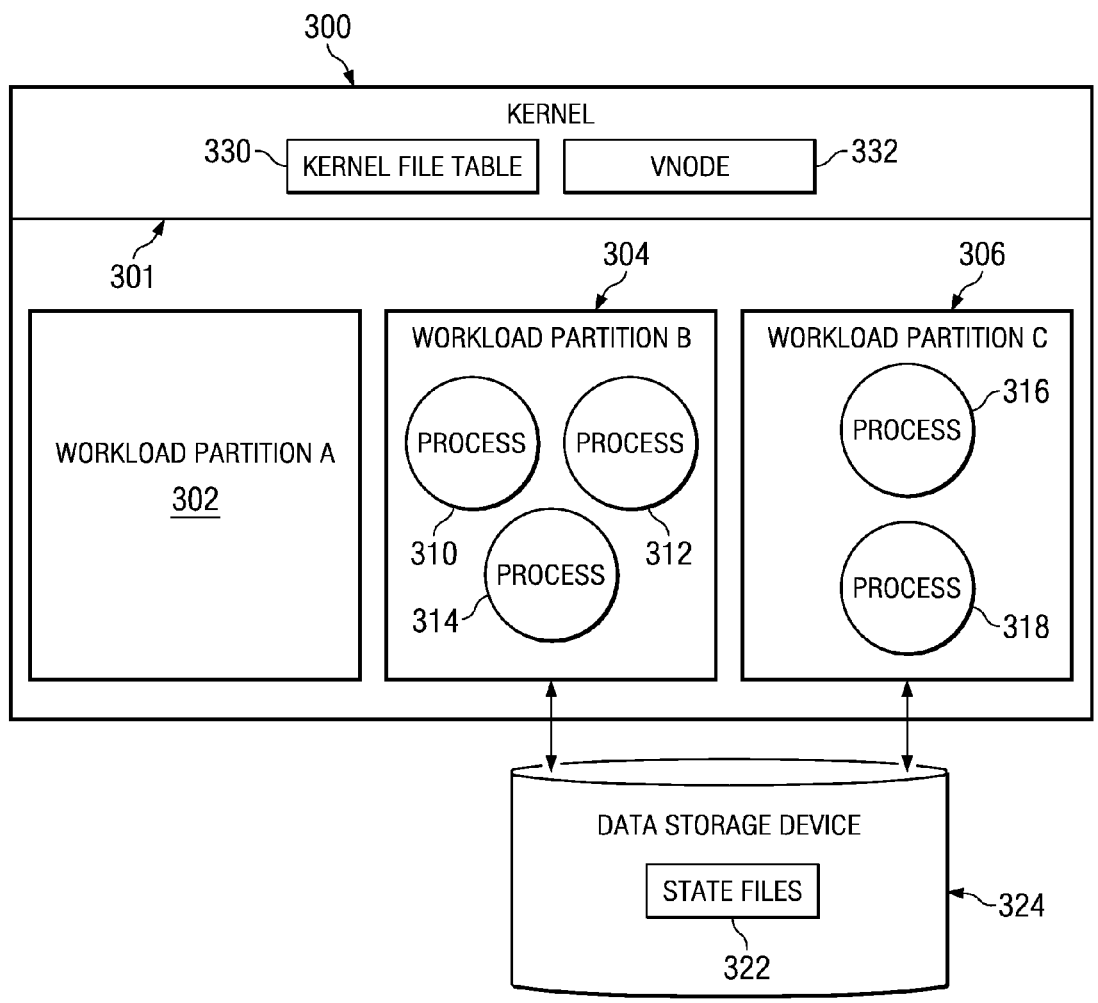
FIG. 3 is a block diagram illustrating exemplary components in a kernel in accordance with an illustrative embodiment.

FIG. 3 is a block diagram illustrating exemplary components in a kernel during a checkpoint process in accordance with an illustrative embodiment. Data processing system 300 may be implemented in any type of known or available computing device, including, but not limited to, client 110 or server 104 in FIG. 1.

Data processing system 300 includes kernel 301. Kernel 301 is an abstraction layer between hardware and software on data processing system 300. Kernel 301 includes software for managing resources on data processing system 300, such as processor resources, input and output (I/O) resources, and memory resources on a computing device. In this example, kernel 301 is a kernel associated with a UNIX® operating system.

Kernel 301 is a kernel in a workload partitioned (WPAR) environment. A workload partitioned environment is an environment on data processing system 300 that includes two or more workload partitions. In this example, data processing system 300 includes workload partition A 302, workload partition B 304, and workload partition C 306. However, a workload partitioned environment is not limited to three workload partitions. In accordance with the illustrative embodiments, a workload partitioned environment may include any number of workload partitions.

Each workload partition may include one or more processes. A process is an executing instance of a computer program or application, a task, or an operation being performed on data. In other words, a process executes the instructions in a computer program. In this example, workload partition B 304 includes processes 310-314. Workload partition C 306 includes processes 316-318. Processes 310-314 within workload partition B 304 may communicate with each other by using UNIX® domain sockets. In addition, processes 316-318 within workload partition C 306 may communicate with each other by using UNIX® domain sockets.

When a process, such as process 310, wishes to communicate file descriptors and/or any other type of data to another process in the same workload partition, such as process 312, the process 310 binds to a socket file to establish bound UNIX® domain socket. The socket file is any type of file for allowing or enabling a process to bind to a socket for establishing a communications link with another process in the same workload partition. The listening process, in this example, process 310, binds to a UNIX® domain socket. The UNIX® domain socket of another process such as process 312 then connects to the UNIX® domain socket associated with process 310 that is bound to the socket file.

Vnode 332 is a virtual node data structure representing an open socket file. Vnode 332 is saved in the global portion of kernel 300 as a data structure. Vnode 332 contains information regarding the first UNIX® domain socket that is bound to the socket file Vnode 332 includes a pointer to the first UNIX® domain socket to which the socket file is bound. The bound UNIX® domain socket likewise also includes a pointer that points to vnode 332.

Each process in a workload partition includes a checkpoint process. A checkpoint process is software for identifying and saving checkpoint data regarding the state of the process associated with the checkpoint process. Thus, a checkpoint process associated with process 310 identifies and saves checkpoint data for process 310.

State data for each process in a given workload partition is saved in a state files 322. State files 322 are a set of one or more state files containing state information for workload partitions. Each state file in state files 322 contains state information for a given workload partition. In other words, each workload partition has an associated state file in state files 322.

State files 322 are stored in data storage device 324. Data storage device 324 is any type of known or available device for storing data, including, without limitation, a hard disk, a compact disk (CD), a compact disk rewrite-able (CD-RW), a compact disk read only memory, a non-volatile random access memory (NV-RAM), a flash memory, or any other type of data storage device.

In this example, data storage device 324 is located locally to data processing system 300. However, data storage device 324 may also be located remotely to data processing system 300. A network data storage device is a data storage device that is accessed by data processing system 300 via a network connection, such as storage unit 108 in FIG. 1.

In other words, data storage device 324 may include a network data storage device that is accessible to kernel 300 via a network device. A network device (not shown) is any type of network access software known or available for allowing a computing device to access a network. The network device connects to a network connection. The network connection permits access to any type of network. For example, a network may include, but is not limited to, a local area network (LAN), a wide area network (WAN), the Internet, an intranet, an Ethernet, a wireless network, or any other type of network.

In this example, data storage device 324 is a single data storage device. However, in accordance with the illustrative embodiments, data storage device 324 may include two or more data storage devices. For example, data storage device 324 may include a local hard disk, a local non-volatile random access memory, and a remote hard disk that is available to kernel 301 over a network connection.

A checkpoint process associated with processes 310-314 saves state information regarding processes 310-314 in a state file in state files 322 for later use in restoring processes 310-314 in workload partition 304 if workload partition 304 should need to be restored due to a system failure, an exception condition, or any other event that results in a need to restore workload partition 304.

A checkpoint process saves a list of open files and sockets associated with each process. In other words, a checkpoint process saves a pointer to each file and each socket that each process in a workload partition has open at a given time. Open files are located in kernel file table 330 in kernel 301. All processes in workload partitions 302-306 share kernel file table 330. Thus, for each file that is opened in kernel file table 330, a checkpoint process saves a pointer or reference to the open file.

In accordance with the illustrative embodiments, a checkpoint process also saves the absolute pathname for any socket file to which a UNIX® domain socket is bound. For example, if process 310 binds to a UNIX® domain socket to enable communications with process 312, the checkpoint process saves the absolute pathname for the socket file when process 310 binds to it. A path is the general form of a file that includes the file's name and location in a file system. An absolute pathname is a path that points to the same location in the file system regardless of the working directory. The absolute pathname may be used to locate a file regardless of the location or directory in a file system that the process or user happens to begin searching for the file using the pathname.

In accordance with the illustrative embodiments, a checkpoint process also saves the absolute pathname that the UNIX® domain socket it is connected to has saved. For example, if process 312 has a UNIX® domain socket connected to the UNIX® domain socket of process 310, the process 312 will save the absolute pathname that the UNIX® domain socket of process 310 is bound to.

Figure 4:
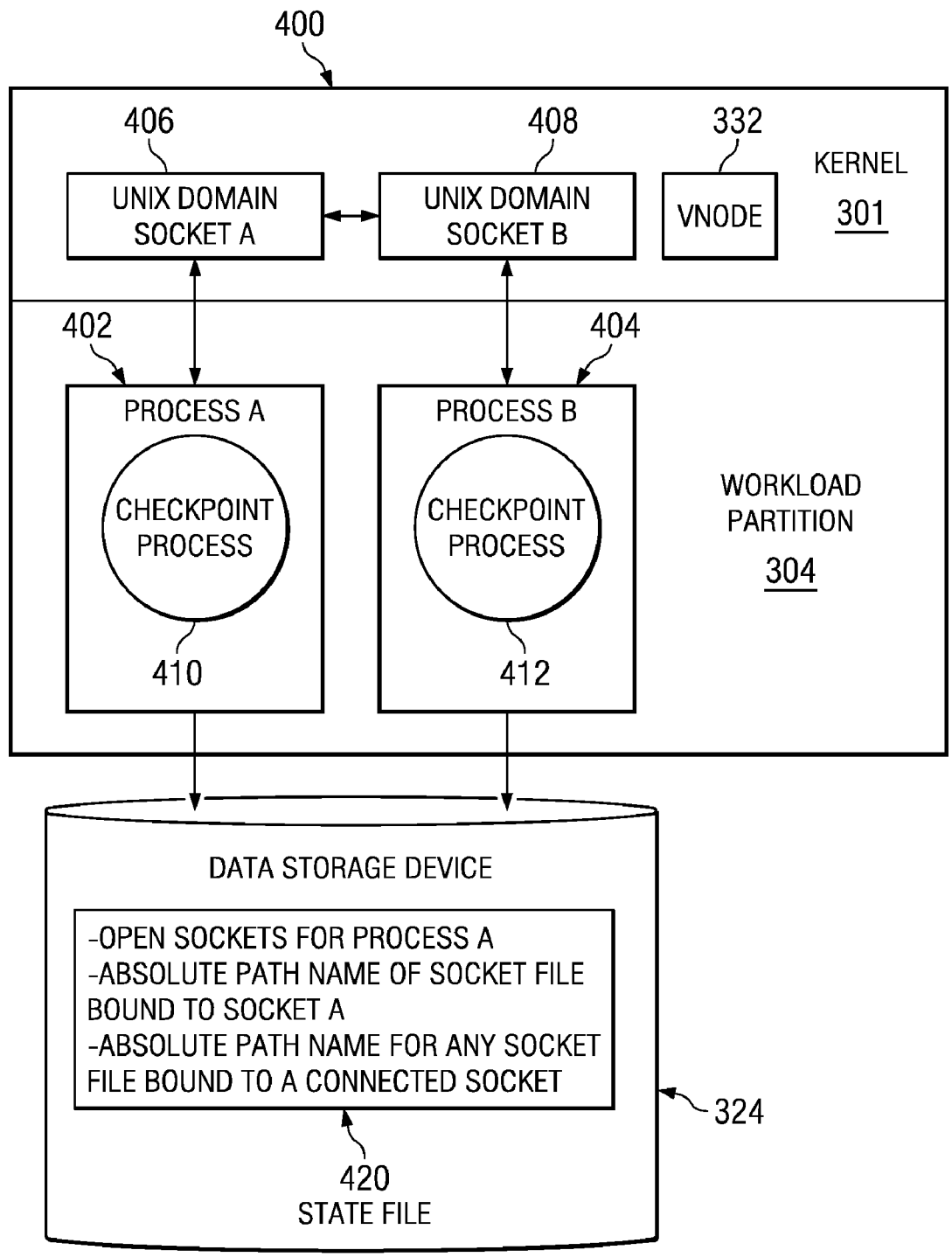
FIG. 4 is a block diagram illustrating exemplary components in a workload partition during a checkpoint and restoration process in accordance with an illustrative embodiment.

Turning now to FIG. 4, a block diagram illustrating exemplary components in a workload partition during a checkpoint and restoration process is depicted in accordance with an illustrative embodiment. Data processing system 300 may be implemented in any type of known or available computing device, including, but not limited to, client 110 or server 104 in FIG. 1 and/or data processing system 300 in FIG. 3.

Process A 402 is any type of process executing in workload partition 304, such as process 310 in FIG. 3. Process A 402 initiates a communications connection with process B 404 to send a file descriptor or other data to process B 404. Therefore, process A 402 binds to UNIX® domain socket A 406 using a socket file.

UNIX® domain socket A 406 binds to the socket file. UNIX® domain socket B 408 connects to UNIX® domain socket A 406 to establish the communications link between process A 402 and process B 404. Once the link is established between UNIX® domain socket A 406 and UNIX® domain socket B 408, process A 402 can send to process B 404 and/or receive data from process B 404.

At a checkpoint time, a checkpoint process, such as checkpoint process 410 associated with process A 402 or checkpoint process 412 associated with process B 404, gathers and saves state data regarding the state of process A 402. Checkpoint process 410 stores the state data for workload partition 304 in state file 420. Checkpoint process 412 also saves data regarding the state of process B 404. Checkpoint process 412 also saves the absolute pathname of the UNIX® domain socket 406 because UNIX® domain socket 406 is connected to UNIX® domain socket 408 that belongs to or is associated with process 404. State file 420 is a file in a set of state files stored on data storage device 324.

In this example, state file 420 includes state data identifying all open files and open sockets bound to process A 402. An open file bound to a process is a file that the process opened. For example, a process may open a file to read data from the file and/or to write data to the file. A file that is being read from or written to by a process is an open file bound to the process. An open socket bound to a process is a socket that is open and being used by a process. In this example, UNIX® domain socket A 406 is an open socket that is bound to process A 402. State file 420 also includes state data regarding the state of each process in workload partition 304. Gathering state data regarding open files and open sockets bound to process may be performed using any known or available method for gathering state data by a checkpoint process.

In accordance with the illustrative embodiments, checkpoint process 410 also saves the absolute pathname of the socket file bound to each process. In this example, checkpoint process 410 saves the absolute pathname of the socket file bound to process A 402 that is used to establish the communications link between UNIX® domain socket A 406 and UNIX® domain socket B 408.

During the first restoration phase, checkpoint process 410 restores the processes, bound files, bound sockets, and sockets of interest that are connected to bound sockets. During the second restoration phase, checkpoint process restores the linkages or communication connections between the processes without using data stored in state file 420.

In particular, during the first phase of the restoration process, checkpoint process 410 utilizes data regarding the state of each process saved in state file 420 to restore each process in workload partition 304. Referring back to FIG. 3, checkpoint process 410 would use data regarding the state of each process to restore processes 310-314.

Next, checkpoint process uses data identifying open files and open sockets bound to each process to restore those open files and open sockets. Data identifying open files and open sockets includes pointers saved in state file 420 that point to the open files and/or open sockets.

In accordance with the illustrative embodiments, checkpoint process 410 utilizes the absolute pathname of each socket file bound to a process in workload partition 304 to restore the bound socket files. The checkpoint process 410 utilizes the absolute pathname for any socket connected to the bound socket to restore connected sockets. The process of restoring a bound socket includes re-binding a socket to the saved absolute pathname and this restores the pointer to vnode 332 representing the bound socket file. Kernel 301 looks up vnode 332 using the pointer to vnode 332 to determine which socket is bound to the socket file associated with vnode 332.

Once the connected socket has been restored, the checkpoint process 410 uses the absolute pathname saved to lookup the vnode 332 and saves the pointer to the vnode in the restored socket structure for the UNIX® domain socket. The vnode contains information regarding the bound socket file and points to the bound socket. The vnode 332 may not yet contain a pointer to the bound socket 406 if the bound socket has not yet been restored. Eventually in this phase the bound socket will be restored and the bound socket also points to vnode 332. In this manner, it is irrelevant whether the bound socket or the connected socket is restored first during the first phase of the restoration process.

Checkpoint process 412 then saves a pointer to vnode 332 in the socket structure for the connected socket of interest. In this example, the connected socket is UNIX® domain socket B 408. Checkpoint process 412 saves the pointer to the vnode in the socket structure for the socket of interest because bound UNIX® domain socket A 406 pointed to by vnode 332 may not be available and/or may not have been restored when UNIX® domain socket B 408 is restored.

In this example, the first phase has been described as restoring processes, open files and open sockets, bound files, and saving pointers to the vnode in the socket structure. However, in accordance with the illustrative embodiments, these steps may occur in a different order, in a reverse order, and/or may occur simultaneously or concurrently during the first phase of the restoration process.

During the second phase, checkpoint process 412 makes a determination as to whether there is a need to connect UNIX® domain socket B 408 to UNIX® domain socket A 406.

If a connection needs to be restored, checkpoint process 412 checks for a pointer to a vnode, such as pointer to vnode 332 in UNIX® domain socket A 406. Checkpoint process 412 dereferences pointer to vnode 332 to identify the UNIX® domain socket A 406 bound to the socket file represented by vnode 332. In this manner, the pointer to vnode 332 in UNIX® domain socket B 408 may be used to restore the connection between UNIX® domain socket A 406 and UNIX® domain socket B 408 because the pointer to vnode 332 in UNIX® domain socket B 408 points to vnode 332 and vnode 332 points to UNIX® domain socket A 406 which is bound to the open socket file. Thus, vnode 332 may be used to restore the linkage between UNIX® domain socket A 406 and UNIX® domain socket B 408 during the second phase of workload partition 304 restoration without utilizing any state data saved in state file 420.

Figure 5:
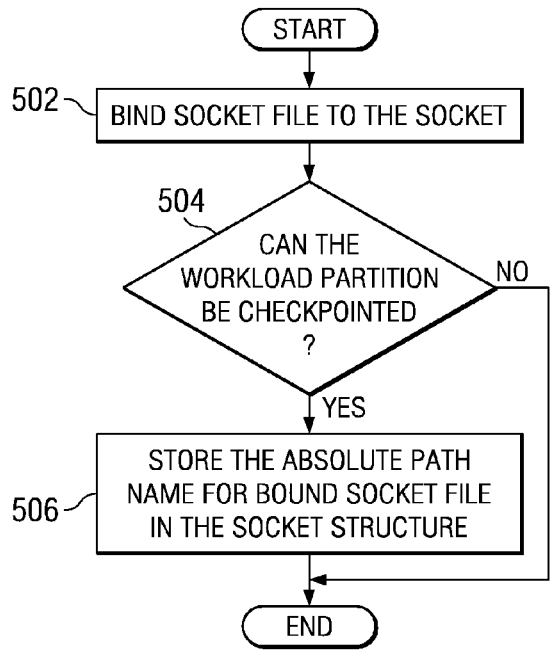
FIG. 5 is a flowchart for illustrating a process for saving an absolute pathname for bound UNIX® domain sockets in accordance with an illustrative embodiment.

FIG. 5 is a flowchart for illustrating a process for saving an absolute pathname for bound UNIX® domain sockets in accordance with an illustrative embodiment. The process in FIG. 5 may be implemented by a process in a workload partition, such as process A 402 in FIG. 4.

The process begins by binding a socket file to a socket (step 502) and then making a determination as to whether the workload partition can be check-pointed (step 504). If the state of the processes in the workload partition can not be check-pointed, the process terminates thereafter. If the state of the processes in the workload partition can be saved during a checkpoint operation, the process saves the absolute pathname or filename for the bound UNIX® domain socket into the socket structure that is being bound to the socket file (step 506) with the process terminating thereafter.

Figure 6:
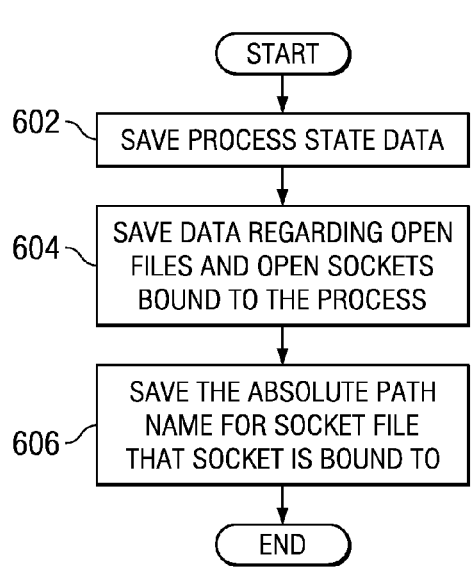
FIG. 6 is a flowchart illustrating a process for a checkpoint operation saving state data for a process bound to a socket file in a workload partition in accordance with an illustrative embodiment.

FIG. 6 is a flowchart illustrating a process for a checkpoint operation saving state data for a process bound to a socket file in a workload partition in accordance with an illustrative embodiment. The process in FIG. 6 may be implemented by a software process for saving workload partition state data, such as checkpoint process 410 in FIG. 4.

The checkpoint process begins by saving process state data for the process (step 602). The checkpoint process saves state data in a state file associated with the workload partition. Next, the process saves data regarding open files and open UNIX® domain sockets bound to the process in the state file (step 604). An open socket bound to a process may include a UNIX® domain socket for communicating with another process in the same workload partition.

The checkpoint process saves the absolute pathname for the socket file that a socket is bound to (step 606) with the process terminating thereafter. In other words, if a socket associated with a process is bound to a socket file, the absolute pathname for the bound socket file is saved in the state file.

Figure 7:
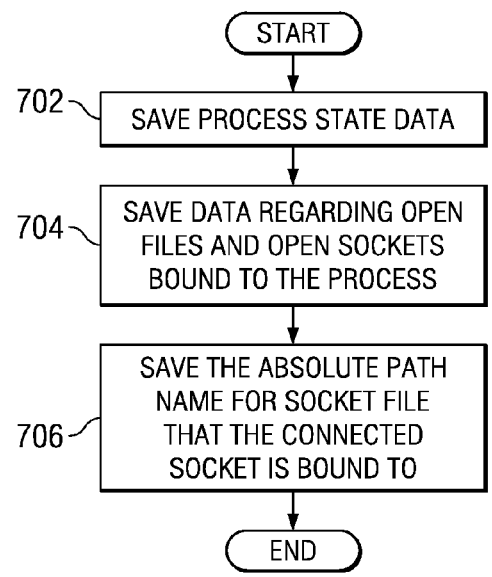
FIG. 7 is a flowchart illustrating a process for a checkpoint operation saving state data for a UNIX® domain socket connected to another UNIX® domain socket in a workload partition in accordance with an illustrative embodiment.

FIG. 7 is a flowchart illustrating a process for a checkpoint operation saving state data for a UNIX domain socket connected to another UNIX domain socket in accordance with an illustrative embodiment. The process in FIG. 7 may be implemented by a software process for saving workload partition state data, such as checkpoint process 412 associated with process B 404 in FIG. 4.

The checkpoint process begins by saving process state data for the process (step 702). The checkpoint process saves state data in a state file associated with the workload partition. Next, the process saves data regarding open files and open UNIX® domain socket bound to the process in the state file (step 704). An open socket bound to a process may include a UNIX® domain socket for communicating with another process in the same workload partition. The checkpoint process then saves the absolute pathname for the socket file that the connected socket is bound to (step 706) with the process terminating thereafter. In other words, if a socket associated with a process is not bound to a socket file but the socket is connected to a socket that is bound to a socket file, the absolute pathname of the connected socket is saved in the state file. The connected socket is a socket of interest.

Figure 8:
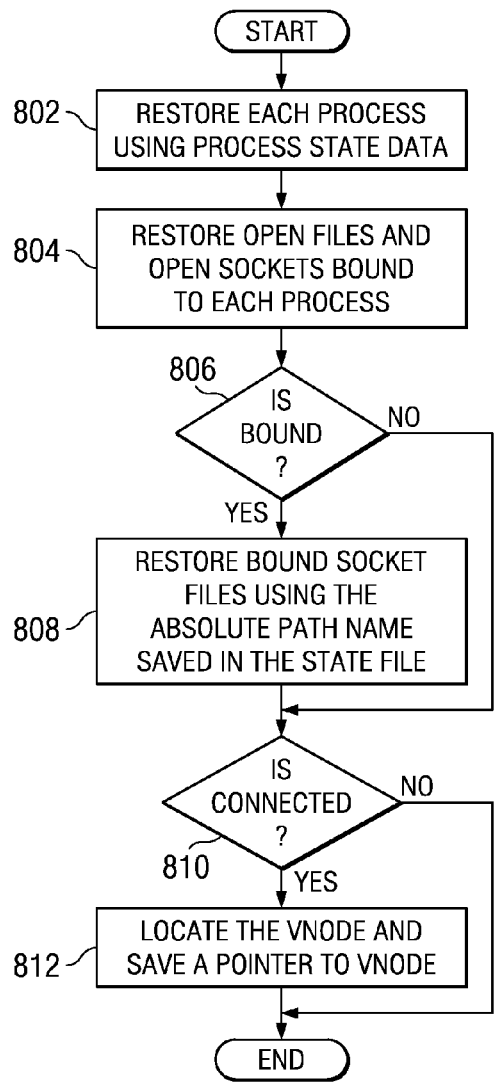
FIG. 8 is a flowchart illustrating a process for restoring a connected UNIX® domain socket in a workload partition using saved state data for the workload partition during the first phase of restoration in accordance with an illustrative embodiment.

Referring now to FIG. 8, a flowchart illustrating a process for restoring connected UNIX® domain sockets in a workload partition using saved state data for the workload partition during the first phase of restoration is shown in accordance with an illustrative embodiment. The process in FIG. 8 may be implemented by a software process for restoring a workload partition, such as checkpoint processes 410 and process 412 in FIG. 4. In this example step 808 is performed by checkpoint process 410 in FIG. 4. Step 812 is performed by checkpoint process 412 in FIG. 4.

The checkpoint process begins by restoring each process in a workload partition by using process state data for each process stored in a state file (step 802). The process restores any open files and/or open sockets bound to any process in the workload partition using state data in the state file (step 804).

The checkpoint process makes a determination as to whether a socket file is bound to a socket associated with a process (step 806). If a socket file is bound, the checkpoint process restores the bound socket file using the absolute pathname for the socket saved in the state file (step 808). This ensures that the vnode is pointing to the bound socket.

The checkpoint process then makes a determination as to whether a socket is connected to the socket that is bound to the socket file (step 810). If a socket is not connected, the checkpoint process terminates thereafter.

Returning to step 810, if a socket is connected, the checkpoint process locates the vnode of the socket to connect to and save a pointer (step 812) with the process terminating thereafter. In other words, the checkpoint process locates the vnode and saves a pointer to the vnode in the socket structure of the socket that is to be connected to the bound socket.

Figure 9:
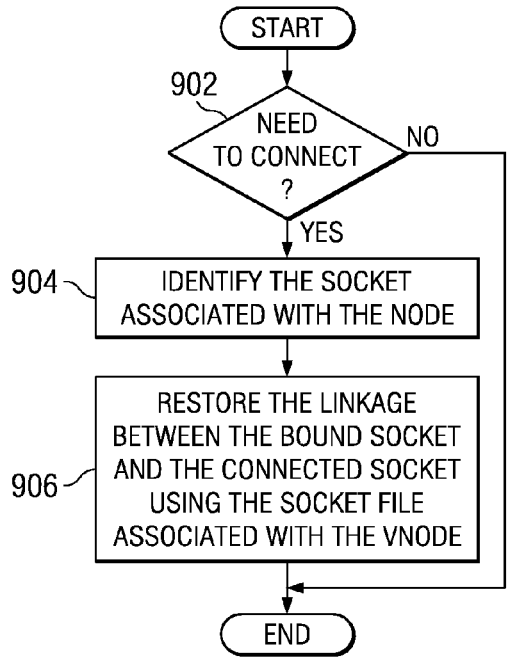
FIG. 9 is a flowchart illustrating a process for restoring a connected UNIX® domain socket in a workload partition using saved state data for the workload partition during the second phase of restoration in accordance with an illustrative embodiment.

Turning now to FIG. 9, a flowchart illustrating a process for restoring connected UNIX® domain sockets in a workload partition using saved state data for the workload partition during the second phase of restoration is shown in accordance with an illustrative embodiment. The process in FIG. 9 may be implemented by a software process for restoring a workload partition, such as checkpoint process 412 as it has a connected socket in FIG. 4.

The checkpoint process begins by making a determination as to whether a connection between a bound socket and another socket needs to be established or restored (step 902). If a connection does not need to be reestablished, the checkpoint process terminates thereafter.

Returning to step 902, if a connection does need to be re-established, the checkpoint process identifies the socket file associated with the vnode (step 904). The checkpoint process then restores the linkage between the bound UNIX® domain socket and the connected socket connecting two processes using the socket file associated with the vnode (step 906) with the process terminating thereafter.

Thus, the illustrative embodiments provide a checkpoint process in a workload partitioned environment. Process state data for a sending process in the workload partition is generated. In one embodiment, process state data for a process in a workload partition is saved. Process state data is data used to restore the process to a given state. State data associated with open sockets and open files bound to the process are saved. In response to a determination that the process is associated with a UNIX® domain socket that is bound to a socket file, an absolute pathname for the socket file bound to UNIX® domain socket is saved. A UNIX® domain socket associated with a connecting process in the workload partition uses the socket file to connect to a UNIX® domain socket associated with a listening process in the same workload partition to enable the two processes to communicate.

In another embodiment, a computer implemented method, apparatus, and computer program product is provided for restoring processes in a workload partitioned environment. In one embodiment, a first process in a workload partition in the workload partitioned environment is restored using process state data for the process. Open files and open sockets bound to the first process are restored. A socket file bound to a first UNIX® domain socket associated with the first process is restored using an absolute pathname for the socket file saved in a state file associated with the workload partition.

In response to a determination that a connection between the first UNIX® domain socket bound to the socket file and a second UNIX® domain socket associated with a second process needs to be restored, a pointer to a virtual node representing the socket file in the second domain socket is saved. The virtual node points to the first domain socket and wherein the first domain socket points to the virtual node.

The restore of UNIX® domain sockets is performed in multiple phases. The first phase occurs when processes, bound files, and bound sockets are restored. This phase is performed using the information in the state file. Because the sockets of interest, such as connected sockets and referenced sockets, may not exist at this time, a pointer to the vnode is saved in a socket that is connected to a socket that is bound to the socket file represented by the vnode. Thus, the connected socket includes a pointer to the vnode, the vnode includes a pointer to the bound socket, and the bound socket includes a pointer back to the vnode. In this manner, the bound domain socket and connected domain socket may be restored using the vnode regardless of which socket is restored first because both the connected socket and the bound domain socket have a pointer to the vnode representing the socket file.

By the second phase, all sockets have been restored and include pointers to the associated vnode. Because pointers to the vnodes of the sockets of interest were saved in the first phase, the linkages between the UNIX® domain sockets may be easily established in the second phase without the need for any additional data. In other words, the communication linkage between the bound domain socket and the connected domain socket can be re-established using the pointers to the vnode to identify the socket file and establish the communication connection without reference to information in the state file.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing state data in a workload partitioned environment by instructions executed on a processor, the computer implemented method comprising:

generating process state data for a first process in a workload partition, wherein the process state data is data used to restore the first process to a given state;

identifying socket state data associated with a set of connected sockets associated with the first process, wherein the set of connected sockets are open sockets;

saving the process state data and the socket state data to form saved state data, wherein the saved state data is used to restore the set of connected sockets when the workload partition is restored;

restoring a socket file bound to a first socket associated with the first process using an absolute pathname for the socket file saved in a state file associated with the workload partition; and responsive to a determination that a connection between the first socket bound to the socket file and a second socket associated with a second process needs to be restored, saving a pointer to a virtual node representing the socket file in the second socket, wherein the virtual node points to the first socket and wherein the first socket points to the virtual node.

2. The computer implemented method of claim 1 wherein identifying the socket state data associated with the set of connected sockets that are open in the first process further comprises:

responsive to a determination that the first process is associated with the first socket that is bound to the socket file, saving the absolute pathname for the socket file bound to the first socket to form the socket state data.

3. The computer implemented method of claim 1 wherein identifying the socket state data associated with connected sockets that are open in the first process further comprises:

responsive to a determination that the first process is associated with the first socket that is bound to the socket file, saving an absolute pathname for the first socket bound to the socket file to the state file.

4. The computer implemented method of claim 1 wherein the first process is a connecting process in the workload partition and further comprising:

using, by the first socket in the set of connected sockets associated with a listening process, the socket file to connect to the second socket in the set of connected sockets associated with a listening process in the workload partition, wherein connecting to the listening process using the socket file enables the connecting process and the listening process to communicate with each other.

5. The computer implemented method of claim 1 wherein the workload partition is located on a first data processing system and wherein the saved state data is used to restore the set of connected sockets in a restored workload partition when the workload partition on the first data processing system is restored on a second data processing system to form the restored workload partition.

6. The computer implemented method of claim 1 further comprising:

responsive to a determination that the first process is associated with a connected socket that is connected to a bound socket, saving the absolute pathname for a socket file bound to the connected socket, wherein the bound socket is a socket that is bound to the socket file.

7. The computer implemented method of claim 1 wherein saving the process state data and socket state data to form saved state data further comprises:

storing the saved state data in the state file associated with the workload partition.

8. The computer implemented method of claim 1 wherein the set of connected sockets associated with the first process is a set of UNIX® domain sockets.

9. The computer implemented method of claim 1 further comprising:

restoring the first process and the set of connected sockets using the saved state data.

10. A computer implemented method for restoring processes in a workload partitioned environment by instructions executed on a processor, the computer implemented method comprising:

restoring a first process in a workload partition in the workload partitioned environment using process state data for the first process;

restoring open files and open sockets bound to the first process;

restoring a socket file bound to a first socket associated with the first process using an absolute pathname for the socket file saved in a state file associated with the workload partition; and responsive to a determination that a connection between the first socket bound to the socket file and a second socket associated with a second process needs to be restored, saving a pointer to a virtual node representing the socket file in the second socket, wherein the virtual node points to the first socket and wherein the first socket points to the virtual node.

11. The computer implemented method of claim 10 further comprising:

retrieving the absolute pathname for the socket file and the pointer to the virtual node for the socket file from the state file associated with the workload partition.

12. The computer implemented method of claim 10 further comprising:

responsive to restoring the second socket, saving the pointer to the virtual node for the socket file bound to the first socket in the second socket.

13. The computer implemented method of claim 10 wherein the first process, the second process, the first socket, and the second socket are restored during a first restoration phase using state data in the state file associated with the workload partition and further comprising:

responsive to restoring a connection between the first socket and the second socket, establishing a communication linkage between the first socket and the second socket using the socket file and the pointer to the virtual node saved in the second socket, wherein the communication linkage is restored during a second restoration phase without using any state data stored in the state file.

14. A computer program product comprising:
a computer usable storage medium including computer usable program code for managing state data in a workload partitioned environment, the computer usable program code executed by a processor to perform the steps of:
generating process state data for a first process in a workload partition, wherein the process state data is data used to restore the first process to a given state;
identifying socket state data associated with a set of connected sockets associated with the process, wherein the set of connected sockets are open sockets;
saving the process state data and the socket state data to form saved state data, wherein the saved state data is used to restore the set of connected sockets when the workload partition is restored;
restoring a socket file bound to a first socket associated with the first process using an absolute pathname for the socket file saved in a state file associated with the workload partition; and
responsive to a determination that a connection between the first socket bound to the socket file and a second socket associated with a second process needs to be restored, saving a pointer to a virtual node representing the socket file in the second socket, wherein the virtual node points to the first socket and wherein the first socket points to the virtual node.

15. The computer program product of claim 14 further comprising:
saving the absolute pathname for the socket file bound to the first socket in the set of connected sockets and an absolute pathname for the first socket bound to the state file to form the socket state data in response to a determination that the first process is associated with a socket that is bound to the socket file.

16. The computer program product of claim 14 further comprising:
restoring the first process and the set of connected sockets using the saved state data.

17. An apparatus comprising:
a bus system;
a communications system connected to the bus system;
a memory connected to the bus system, wherein the memory includes computer usable program code; and
a processing unit connected to the bus system, wherein the processing unit executes the computer usable program code to generating process state data for a process in a workload partition, wherein the process state data is data used to restore the process to a given state; identify socket state data associated with a set of connected sockets associated with the process, wherein the set of connected sockets are open sockets; save the process state data and the socket state data to form saved state data, wherein the saved state data is used to restore the set of connected sockets when the workload partition is restored; restoring a socket file bound to a first socket associated with the first process using an absolute pathname for the socket file saved in a state file associated with the workload partition; and responsive to a determination that a connection between the first socket bound to the socket file and a second socket associated with a second process needs to be restored, saving a pointer to a virtual node representing the socket file in the second socket, wherein the virtual node points to the first socket and wherein the first socket points to the virtual node.

18. The apparatus of claim 17 wherein the processor unit further executes the computer usable program code to save the absolute pathname for the socket file bound to the first socket in the set of connected sockets and an absolute pathname for the first socket bound to the state file to form the socket state data in response to a determination that the first process is associated with the first socket that is bound to the socket file.

19. The apparatus of claim 17 wherein the processor unit further executes the computer usable program code to restore the first process and the set of connected sockets using the saved state data.

* * * * *